(12) United States Patent
    Dominique

(10) Patent No.: US 8,515,233 B2
(45) Date of Patent: Aug. 20, 2013

(54) ADAPTOR FOR MOUNTING CABLE CONNECTORS

(76) Inventor: Jeffrey Michael Dominique, Chandler, AZ (US)

( * ) Notice: Subject to any disclaimer, the term of this patent is extended or adjusted under 35 U.S.C. 154(b) by 659 days.

(21) Appl. No.: 12/660,720

(22) Filed: Mar. 3, 2010

(65) Prior Publication Data

US 2011/0217014 A1    Sep. 8, 2011

(51) Int. Cl.
    *G02B 6/00*    (2006.01)
(52) U.S. Cl.
    USPC .......................................... 385/134; 385/136
(58) Field of Classification Search
    None
    See application file for complete search history.

(56) References Cited

U.S. PATENT DOCUMENTS

| 4,793,683 | A | * | 12/1988 | Cannon et al. ................. 385/60 |
| 5,607,323 | A | * | 3/1997 | Foster et al. .................. 439/557 |
| 6,079,881 | A | | 6/2000 | Roth |
| 6,201,921 | B1 | | 3/2001 | Quesnel et al. |
| 6,283,642 | B1 | | 9/2001 | Schroeder et al. |
| 6,305,849 | B1 | | 10/2001 | Roehrs et al. |
| 6,467,971 | B1 | | 10/2002 | Carberry et al. |
| 6,511,229 | B2 | | 1/2003 | Kiani |
| 6,764,222 | B1 | | 7/2004 | Szilagyi et al. |
| 6,945,702 | B2 | | 9/2005 | Gherardini |
| 7,014,369 | B2 | * | 3/2006 | Alcock et al. .................. 385/57 |
| 7,418,183 | B2 | | 8/2008 | Wittmeier et al. |
| 7,504,580 | B2 | * | 3/2009 | Lammens et al. .............. 174/50 |
| 7,558,458 | B2 | | 7/2009 | Gronvall et al. |
| 2009/0238520 | A1 | | 9/2009 | Wouters |

* cited by examiner

*Primary Examiner* — Michelle R Connelly

(57) ABSTRACT

An adapter is provided and includes a process for mounting the connectors on two cables being connected in a control cabinet. The adapter includes a circular sleeve with a flange positioned at one end of the sleeve for creating a rigid, fixed connection of the connectors in a conduit bringing cables into the control cabinet.

14 Claims, 3 Drawing Sheets

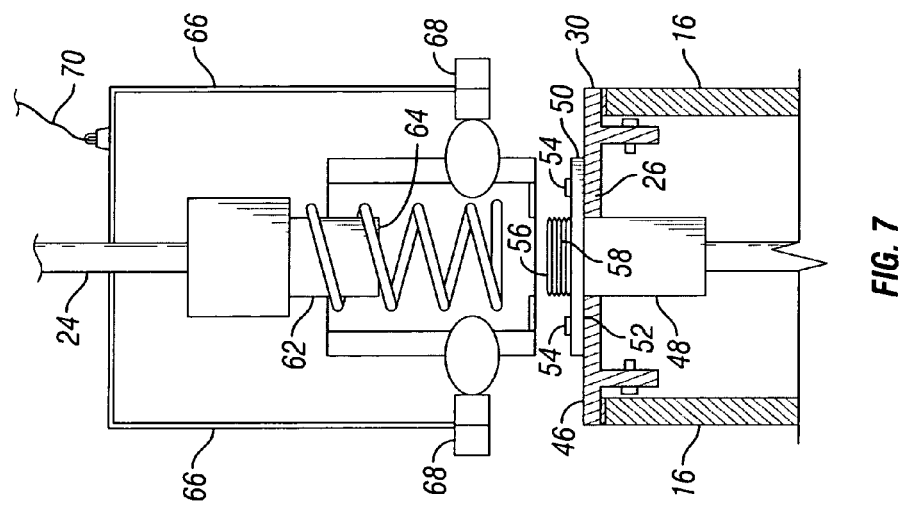
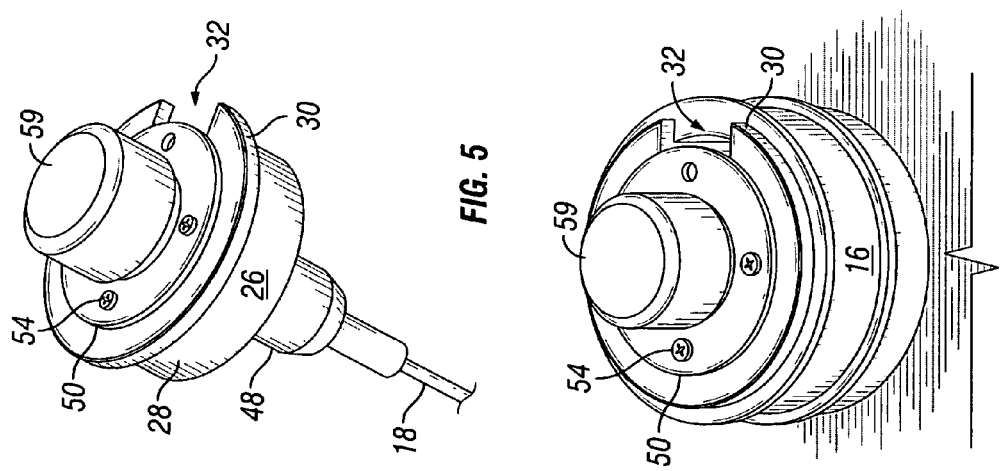

ADAPTOR FOR MOUNTING CABLE CONNECTORS

BACKGROUND

This invention pertains to an adapter for mounting cable connectors. More particularly, this invention pertains to a fiber optic mounting adapter which is positioned a control box or other mounting structure to facilitate the connection of two fiber optic cables.

Many forms of communication transmission and power transmission require physical lines that connect a source terminal to a destination terminal. These physical lines are generally buried in the ground or placed above ground level. In many situations, there is no easy way to access or repair the physical line in the event that the physical line is damaged.

In some applications, such as fiber optics, a stable connection needs to be maintained between terminals. This connection requires that the terminals be properly aligned and held steady during operation in a clean connection. These connections are susceptible to damage caused by sudden motion. Sudden motion may damage the physical line by pulling, tearing, or breaking the physical line.

Physical cables may be used to transmit both power and information. These physical cables are generally made up of a plurality of segments connected together through junctions. In many applications, such as fiber optics, at junctions where a first terminal is connected to a second terminal, a rigid connection is required. The advantage of a rigid connection is that it promotes the connection between the first terminal and the second terminal with transmission mediums such as light waves, electrical signals, or power. The disadvantage of such a connection is that any force applied to the connection may result in damage to the physical cable connected by the junction. In order to avoid damage caused by forces applied to the junction, a quick release mechanism is available to provide the advantages of a physical connection between the first and second terminal while allowing for a quick release of the first terminal from the second terminal in the event of a force being applied to the junction.

For both outdoor and in-building installation of fiber optic and other communication cables, such cables are often placed in conduit or other ducts. The conduit provides protection for both physical and environmental abuse. In underground installations, the conduit protects the cable from shifting rocks, aggressive rodents, digging equipment, and other hazards. Because fiber optic cables have a lower breaking strength and are more easily damaged than copper cables, the use of conduits offers needed protection for fiber optic cables. In metropolitan areas, multiple conduits are often grouped as duct banks to accommodate future growth of the cable infrastructure without major traffic disruptions from cutting and trenching of the streets.

There are a number of applications in the area of traffic monitoring and control, as well as road structure monitoring, where communicating information to a traffic management center or other control center via a fiber optic communication system is advantageous. For the traffic and road monitoring applications, control boxes are generally mounted along the edge of the highway or local streets in proximity to the location where information is being collected. One of the most expensive problems in operating such fiber optic systems is to repair damages caused by traffic accidents which physically damage the control boxes. The fiber optic connections inside the control boxes are often ripped apart and destroyed, and the fiber optic line may be dragged from a first location to a second location by a vehicle. In such a case, the line may need to be re-laid from the source to the destination. The process of replacing fiber optic connectors and relaying fiber optic cable is time consuming, labor intensive, and expensive. In order to avoid the damage caused by sudden motion to a physical line, quick-release fiber optic cable connectors may be used. There is also a need for an adapter to facilitate the mounting and servicing of the fiber optic connectors in a control box.

A typical fiber optic cable includes a fiber optic connector at each end. An optical connector consists of a ferrule, through which the optical fiber is fed. The distal end of the ferrule and fiber combination is polished to a precise endface geometry. The ferrule and fiber endface is butted to another fiber optic cable's ferrule and fiber endface, bringing the fiber endfaces into precise physical contact. In order to minimize signal loss, the fiber and ferrule endfaces must have a very smooth and clean surface. Cleanliness of the fiber and ferrule endface is critical to the good performance of fiber optic connectors. In particular, any imperfections or small particles of dirt on the ends of the optical fibers will tend to reduce the amount of the light energy that passes from one cable to the other. As the amount of imperfections (e.g., scratches) and dirt increases at the optical fiber ends, less and less light energy passes from one cable to the other. In extreme situations, the amount of light energy loss is so great that light detection circuitry at the end of the fiber optic pathway is no longer able to detect the light signal.

For connecting fiber optic cables in an indoor room with controlled access, various mounting racks and other mounting devices may be used facilitate the fiber optic connections. But in the outdoor control boxes and other severe environments, the connectors and the mounting adapters must be more rugged, with features to facilitate the installation, maintenance, and repair of the fiber optic cables and connectors in such environments.

SUMMARY

Embodiments of the invention are defined by the claims below, not this summary. A high-level overview of various aspects of the invention are provided here for that reason, to provide an overview of the disclosure, and to introduce a selection of concepts that are further described below in the detailed-description section below. This summary is not intended to identify key features or essential features of the claimed subject matter, nor is it intended to be used as an aid in isolation to determine the scope of the claimed subject matter.

The present invention includes an adapter which is used to mount the connectors on two cables being connected in a control cabinet. The adapter includes a circular sleeve with a flange positioned at one end of the sleeve. The sleeve is sized to be inserted into the open end of a conduit used to deliver the cable to a control box. The underside of the flange engages the outer surface of the conduit. A longitudinal slot is formed along the full length of the sleeve and the flange to permit the adapter to slide around a cable adjacent to the connector. The cable which is pulled through the conduit and positioned in the sleeve of the adapter includes a connector which is mounted on the outer surface of the adapter flange. A second connector on a cable extending from the first connector in the adapter to a controller or other device is inserted into the open end of the first connector such that a rigid connection of the two connectors is formed at the adapter. A quick-release connector may be used for the connection formed at the adapter, such that when a triggering event occurs, the quick release connector is disengaged and the adapter helps to maintain the position of the other connector to minimize any breaking or pulling of the cable in the conduit. A process is provided for securing the connectors to the adapter and positioning the adapter in an open end of a conduit in a control cabinet.

BRIEF DESCRIPTION OF THE SEVERAL VIEWS OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents. Illustrative embodiments of the present invention are described in detail below with reference to the attached drawing figures, and wherein:

FIG. 5 is a prospective view of a connector of a cable mounted in the adapter prior to positioning in the open conduit in a control box, with the exposed end of the connector being protected by a temporary cap protector.

FIG. 6 is a prospective view of the first connector and the adapter mounted in the open end of a cable conduit in a control box, with the cap protector still in place prior to the connection of the second connector.

FIG. 7 is a schematic view of the first connector secured to the adapter and positioned in the open end of a conduit, and a quick release second connector in position to be connected to the first connector and prior to the setting of the quick release mechanism.

DETAILED DESCRIPTION

The subject matter of embodiments of the present invention is described with specificity herein to meet statutory requirements. But the description itself is not intended to necessarily limit the scope of claims. For the purpose of teaching inventive principles, some conventional aspects of the best mode may be simplified or omitted. Note that some aspects of the best mode may not fall within the scope of the invention as specified by the claims. Thus, those skilled in the art will appreciate variations from the best mode that fall within the scope of the invention. Those skilled in the art will also appreciate that the features described below can be combined in various ways to form multiple variations of the invention. As a result, the invention is not limited to the specific examples described below, but only by the claims and their equivalents.

Although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

Figure 1:
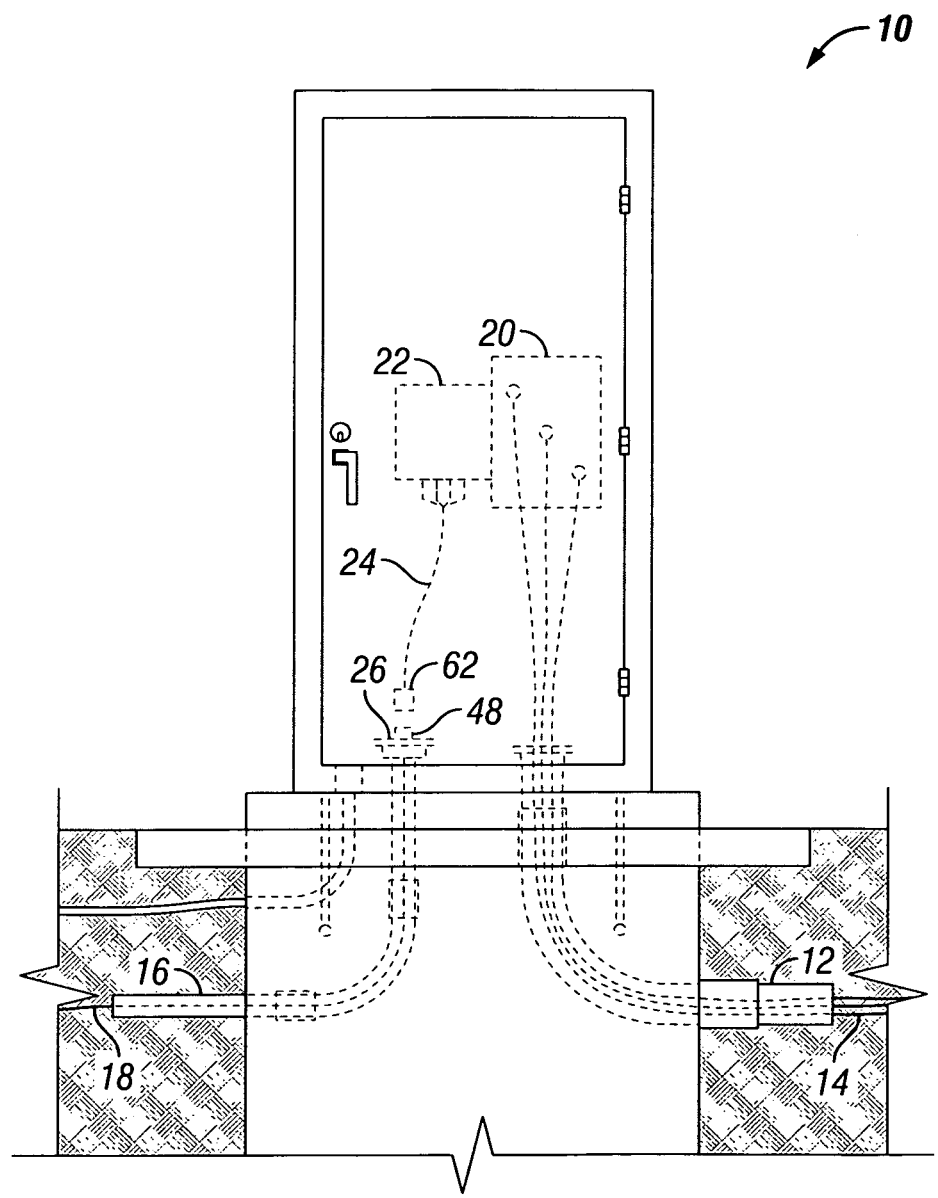
FIG. 1 shows a control box which is used for traffic control and road monitoring, said control box including two conduits entering the bottom of the control box, a first cable connector positioned in the adapter mounted on the conduit at the bottom of the control box, and a second connector for a cable extending from the adapter to a controller mounted in the control box.

Referring now to FIG. 1, a control box 10 provides a enclosure mounted on a concrete pad. For traffic and road monitoring applications, the control box 10 is typically positioned on the side of the road at an intersection or other strategic location. Similar control boxes may be used for other communication transmission or power transmission applications. The control box 10 includes two conduits entering the control box. For traffic control applications, the first conduit 12 contains coaxial cable or twisted pair copper wires 14 and the second conduit 16 contains a lower assembly of fiber optic cables 18. The copper wires 14 may be used to send electrical control signals between the traffic light signal devices, video cameras, crosswalk systems, pavement sensors, and other traffic or road devices (not shown), which are mounted in proximity to the control box 10 and the control system components 20 positioned in the control box 10. The conduits 12, 16 could also enter the side or top of control box 10 for special traffic locations or for control boxes in industries other than traffic control and monitoring.

The control system components 20 are connected to a fiber optic converter 22, which includes one or more transmitters and receivers for converting electric signals to optical signals and vice versa. An upper assembly of fiber optic cables 24 is used to connect the converter 22 to the lower assembly of fiber optic cables 18 positioned in conduit 16. The conduit 16 is typically laid underground and extends from the control box 10 to a fiber optic backbone or fiber optic trunk line cable (not shown). Once the conduit is laid, the lower assembly of fiber optic cables 18 is pulled through the conduit 16 to facilitate connection of the converter 22 to the fiber optic backbone.

Various public and private organizations, such as communication companies or state/local governments, may bury a fiber optic backbone under major highways and streets, or in other right-of-way easements. State and local governments are then able to benefit from a traffic management center having monitors and computer systems to receive traffic and road condition information from a plurality of traffic boxes 10 connected to the fiber optic backbone. The traffic management center may then also control traffic signals and other highway signs by communicating control information back to the individual traffic boxes 10 Fiber optic systems have many known advantages over copper wire systems for long-distance and high-demand applications. As the fiber optic backbone network has expanded in recent years, there are more and more applications which utilize such fiber optic backbones. But fiber optic systems are generally more complex and expensive to install and maintain.

One of the problems faced by state and local governments in maintaining traffic control boxes 10 mounted along a street is the damage caused to the control boxes 10 by traffic accidents or other impact accidents. After an accident, the control box 10 itself and the components 20 or converter 22 may need to be replaced. But the costs are increased significantly if the fiber optic cables 18 are damaged in an accident. If the fiber optic cables 18 are ripped apart or otherwise damaged, the fiber optic cables 18 connecting the converter 22 to the fiber optic backbone will need to be replaced. This often involves significant digging with special equipment, pavement repair work, and other costly repair services to reestablish the fiber optic connection.

Figure 2:
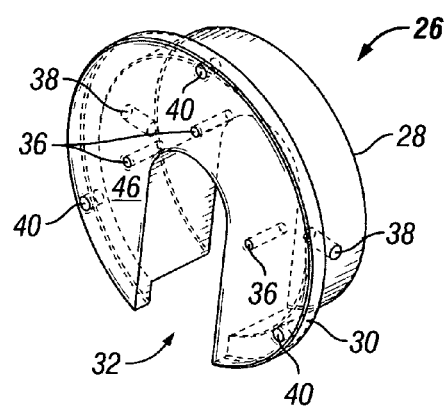
FIGS. 2 and 2A are perspective views of two different adapters to show the different size configurations of the present invention.
Figure 3:
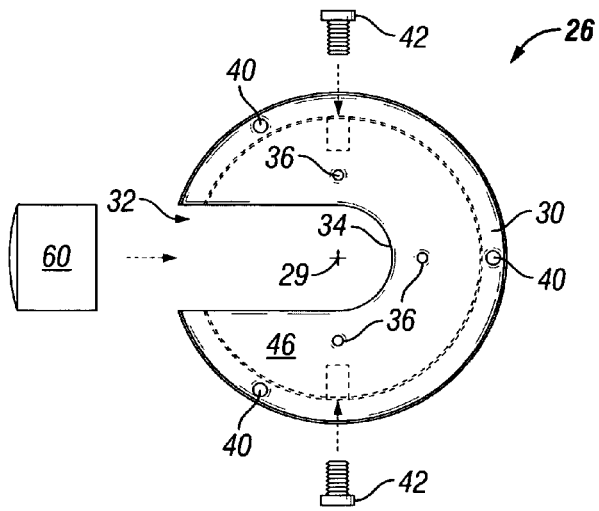
FIG. 3 is a top plan view showing the aperture slot formed in the side of the adapter and a grommet which may be inserted into the aperture.
Figure 4:
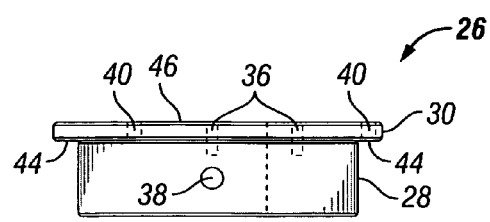
FIG. 4 is a side view side of the adapter.

FIGS. 2-4 show the configuration of the adapter 26 of the present invention. The adapter 26 may be made of any material, including metal, plastic, or rubber. The preferred material and methodology for making the adapter 26 is cast or machined aluminum. The adapter 26 has two main components, a tubular sleeve 28 and a collar flange end plate 30 positioned one end of the circular sleeve 28. The adapter 26 includes an aperture 32 which extends along the full length of the adapter 26. The aperture 32 forms a slot extending longitudinally along the full length of the sleeve 28. The aperture 32 forms a slot in the end plate 30. In the end plate 30, the aperture 32 extends beyond the center line 29 of the sleeve 28, the centerline 29 also generally being the center of the end plate 30. The closed end of aperture 32 includes a rounded inner surface 34 formed in the end plate 30.

The end plate 30 includes one or more connector mounting holes 36 for securing a connector to the adapter 26. The sleeve 28 includes one or more conduit mounting holes 38 formed in the side of the sleeve 28. The end plate 30 may also include one or more conduit mounting holes 40 formed in proximity to the outer edge of the end plate 30.

Figure 2A:
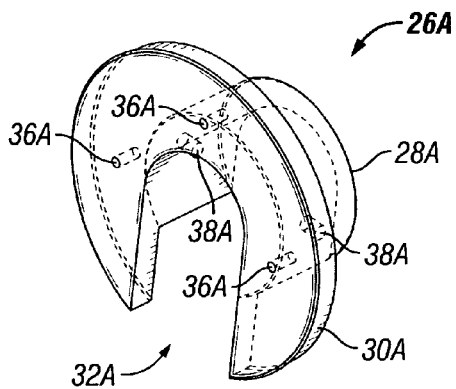

The diameter of sleeve 28 of adapter 26 can be sized to fit inside the conduit 16. Conduit 16 may come in variety of diameters, with standard diameters in the United States including 2 inch, 3 inch, and 4 inch conduit diameters. The outer diameter of the sleeve 28 is sized to be slightly smaller than the inner diameter of the conduit 16 to provide a snug fit for the sleeve 28 in the conduit 16. The length of sleeve 28 can be any length. The preferred range of sleeve length is 0.5 to 1.5 inches. FIG. 2 shows an adapter 26 with a larger diameter sleeve 28 with an end plate 30 that provides a narrower flange lip. FIG. 2A. shows an adapter 26A with a narrower sleeve 28A and an end plate 30A to create a wider flange lip. The adapter 26A has the similar connector mounting holes 36A and conduit mounting holes 38A.

In many installations, the friction fit between the conduit 16 and the sleeve 28 is sufficient to secure the adapter 26 in conduit 16. If a more secure fit is desired, a mounting screw 42 or other form of connector can be used in mounting holes 38. In one embodiment, the mounting screw 42 is first adjustably secured only in the mounting hole 38 prior to insertion of the adapter 26 in the conduit 16, and the adapter 26 is secured by the friction between the head of screw 42 and the inner surface of the conduit 16. In an alternative embodiment, one or more holes are drilled in conduit 16 and one or more screws 42 are secured through the conduit 16 into the mounting holes 38 of the sleeve 28. In an additional embodiment, the adapter 26 can be secured to conduit 16 by securing one or more mounting screws 42 or other fasteners into the outer edge of the conduit 16.

The collar end plate 30 can be of any thickness. The preferred thickness of the end plate 30 is 0.25 to 0.5 inches for use with 2.0 to 4.0 inch diameter conduit 16. The diameter of the end plate 30 can be any size such that the end plate 30 extends beyond the outer edge of the tubular sleeve 28 to form a flange having a lower surface 44 which extend beyond the sleeve 28. A smooth upper surface 46 is provided on the outer surface of the end plate 30. In the preferred embodiment, the diameter of the end plate 30 would also be equal to or slightly greater than the outer diameter of the conduit 16 such that the outer edge of conduit 16 would engage the lower surface 44 of the end plate 30.

Referring now to FIGS. 5-7, the adapter 26 may be used to facilitate the connection of the lower connector 48 of the cable 18 to the upper connector 62 of the cable 24 at the open end of conduit 18 in the control box 10 such that a rigid connection between the two cables is provided. The upper surface 46 of the end plate 30 is used to mount the lower connector 48 of the lower assembly of fiber optic cable 18. The lower connector 48 has a mounting plate 50 such that the lower surface 52 of the mounting plate 50 engages the upper surface 46 of the end plate 30. Drilled and tapped holes 36 in the end plate 30 are aligned with the holes in the mounting plate 50 and mounting screws 54 are used to secure the adapter 26 to the lower connector 48. The lower connector 48 has a connecting mating surface 56 at the open end of the connector 48 and threads 58 or other connection means for alignment with the mating surface of an upper connector. Prior to the connection of the lower connector 48 to the upper connector 62, a protective cap 59 may be positioned over the mating surface 56 of the lower connector 48 to protect the mating surface 56 while work is being performed in the control box 10.

The adapter 26 includes a slot 32 which facilitates the positioning of the adapter 26 at the base of the lower connector 48. The slot 32 extends along the full length of the adapter 26. In most field applications, the lower connector 48 will already be connected to the assembly of fiber optic cables 18 at the time of final installation of the various fiber optic components in the control box 10. There is no way to feed the adapter over the fiber optic cable 18 from the end opposite the lower connector 48. The slot 32 permits the adapter 26 to be slid into position without having to remove and reconnect the lower connector 48 to the assembly of fiber optic cables 18. Although the end plate 30 of the adapter 26 does not have a full surface to engage the mounting plate 50 of the lower connector 48, the connector mounting holes are sufficient to secure the lower connector 48 to the adapter 26.

The use of the adapter 26 may also help to reduce the water and other contaminants from entering the conduit 16 and damaging the assembly of fiber optic cables 18 in the conduit 16. A grommet 60 can be inserted into the slot once the adapter is mounted on the end of the conduit 16 to cover the slot 32 in the adapter. A tape, such as a splicing tape, could be used to wrap the adapter 26 with grommet 60 and the lower connector 48 to seal the opening of the conduit 16. Alternatively, a sealant could be applied to the bottom surface 44 of the end plate 30, to the grommet 60, and to the outer edge of the conduit 16 in order to close the opening of the conduit 16.

Once the lower connector 48 and adapter 26 are positioned in the conduit 16, the upper connector 62 is connected to the lower connector 48. The upper connector is attached to one end of the upper assembly of fiber optic cables 24. The other end of the upper assembly of fiber optic cables 24 is connected to the converter 22 in the control box 10. The preferred type of connector for the upper connector 62 is a quick release connector such as described in U.S. Published Patent Application 2009/0238520, which is incorporated herein by reference. The upper connector 62 includes a threaded opening or a threaded retention ring which is used to secure the upper connector 62 to the lower connector 48. The connector mating surface 64 of upper connector 62 is aligned with the connector making surface 56 of the lower connector 48 such that fiber optic signals can be communicated between the upper assembly 24 and the lower assembly 18 of fiber optic cables. When the upper connector 62 is a quick release connector, a spring mechanism or other potential energy release functionality may be included in the connector 62. An inhibiting force controls the potential energy source. A triggering action removes the inhibiting force and the potential energy is released to separate the upper connector 62 from the lower connector 48. A trip safety ring 68 is used to deactivate the spring mechanism while work is being performed on the upper connector 62. A cage-type trip bracket 66 is a trigger mechanism that may be mounted on the upper connector 62. A trip wire 70 may be attached to the trip bracket 66 and anchored at an appropriate location in the control box 10. Any type of triggering mechanism for a quick release connector, such as magnetic triggers, mechanical triggers, and any other type of triggers. If an impact accident occurs at the control box 10, the impact will cause the trip bracket 66 or other type of trigger mechanism to trigger the release of the spring force, which then caused the upper connector 62 to disengage from the lower connector 48. The upper assembly of fiber optic cables 24 is relatively easy to replace, but as noted above, the lower assembly 18 is much more difficult and expensive to replace. When the upper connector 62 is released in an impact accident to the control box 10, the likelihood of damage to the lower connector 48 and lower assembly of fiber optic cables 18 is greatly reduced.

The process steps in mounting the adapter 26 as part of the fiber optic system in control box 10 include pulling the lower assembly of fiber optic cables 18 through conduit 16. If the lower assembly 18 did not have the lower connector 48 mounted at one end of the lower assembly 18, the lower connector 48 should be attached to the lower assembly 18, a process which is well known in the art. The adapter 26 is then inserted about the lower connector 48. Mounting screws 54 are used to secure the adapter 26 to the lower connector 48. The lower connector 48 and adapter 26 are then positioned in the open end of conduit 16. The grommet 60 is positioned in the slot 32 and then the adapter 26 is sealed in the opening of conduit 16 by using tape or a sealant or counting screws to secure the adapter 26. The upper connector 62 of the upper assembly of fiber optic cable 24 is then connected between the lower connector 48 and the converter 22 in the control box 10. The upper connector 62 is connected to the lower connector 48 and the spring release mechanism is engaged and the trip bracket 66 is mounted. The safety ring 68 is positioned on the upper connector 62 so that the spring release mechanism is not triggered while work is being performed on the upper assembly 24. Once the upper assembly 24 is in place and the work in control box 10 is completed, the trip wire 70 may be attached to the trip bracket 66 and the safety ring 68 removed so that the quick release mechanism will be triggered when an impact accident occurs at the control box 10.

Many different arrangements of the various components depicted, as well as components not shown, are possible without departing from the scope of the claims below. Embodiments of our technology have been described with the intent to be illustrative rather than restrictive. Alternative embodiments will become apparent readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. An adapter for positioning a connector connected to one end of a cable, said connector being located at one end of a conduit through which said cable has been pulled, said adapter comprising:
   a rigid tubular sleeve;
   a rigid end plate formed at one end of the rigid tubular sleeve and extending beyond the rigid tubular sleeve to form a flange, said rigid end plate having a flat outer surface and a flat under surface;
   a first slot formed in said rigid tubular sleeve and extending the full length of said sleeve; and
   a second slot formed in said rigid end plate and aligned with the first slot to form a full length aperture, said second slot extending through the rigid end plate past a centerline of the tubular sleeve;
   wherein the cable and the connector may be positioned through the aperture and into the rigid tubular sleeve of said adapter, the connector may be connected to the outer surface of the rigid end plate of said adapter, and the rigid tubular sleeve of said adapter may be inserted into the conduit such that the under surface of the rigid end plate engages the conduit.

2. The adapter of claim 1, including a plurality of mounting holes formed in the rigid end plate, wherein the connector is secured to the adapter by a plurality of mounting screws inserted into the mounting holes formed in the rigid end plate.

3. The adapter of claim 1, including one or more holes formed in the rigid tubular sleeve and one ore more adjustable conduit fasteners, wherein the one or more adjustable conduit fasteners are adjusted in the one or more holes so that the adjustable conduit fasteners engage an inner surface of the conduit.

4. The adapter of claim 1, including one or more conduit holes formed in the rigid end plate ad one or more conduit fasteners, wherein the adapter is secured to the conduit by one or more conduit fasteners inserted through the conduit holes in the rigid end plate.

5. The adapter of claim 1, including one or more holes formed in the rigid tubular sleeve and one or more conduit fasteners for securing the rigid tubular sleeve of the adapter to the conduit, wherein the one or more conduit fasteners are secured through the conduit and into the holes in the rigid tubular sleeve.

6. The adapter of claim 1, including a grommet inserted into the second slot of the rigid end plate.

7. An adapter for positioning a connector connected to one end of a cable, said connector having a mounting plate and being located at one end au conduit through which said cable has been pulled, said adapter comprising:
   a tubular sleeve;
   an end plate formed at one end of the tubular sleeve and extending beyond the tubular sleeve to form a flange, said end plate having a flat outer surface and a flat under surface;
   a first slot formed in said tubular sleeve and extending the full length of said sleeve; and
   a second slot formed in said end plate and aligned with the first slot to form a full length aperture, said second slot having two straight slot edges spaced apart to receive the connector, and said two straight slot edges extending from an outer edge of the end plate to approximately a centerline of the tubular sleeve;
   wherein the connector and the cable may be positioned through the full length aperture and into the tubular sleeve of said adapter, the mounting plate of the connector may be connected to the outer surface of the end plate of said adapter, and the tubular sleeve of said adapter may be inserted into the conduit such that the under surface of the end plate engages the conduit.

8. The adapter of claim 7, wherein the second slot includes a rounded end extending from one slot edge of the second slot, past the center line of the tubular sleeve, to the other slot edge of the second slot.

9. The adapter of claim 7, including a plurality of mounting holes formed in the end plate, wherein the connector is secured to the adapter by a plurality of mounting fasteners inserted into the mounting holes formed in the end plate.

10. The adapter of claim 7, including one or more holes formed in the tubular sleeve and one or more adjustable conduit fasteners, wherein the one or more adjustable conduit fasteners are adjusted in the one or more holes so that the adjustable conduit fasteners engage an inner surface of the conduit.

11. The adapter of claim 7, including one or more conduit holes formed in the end plate and one or more conduit fasteners, wherein the adapter is secured to the conduit by one or more conduit fasteners inserted through the conduit holes in the end plate.

12. The adapter of claim 7, including one or more holes formed in the tubular sleeve and one or more conduit fasteners for securing the tubular sleeve of the adapter to the conduit, wherein the one or more conduit fasteners are secured through the conduit and into the holes in the rigid tubular sleeve.

13. The adapter of claim 7, including a grommet inserted into the second slot of the end plate.

14. An adapter for positioning a connector connected to one end of a cable, said connector being located at one end of a conduit through which said cable has been pulled, said adapter comprising:

a rigid tubular sleeve;

a rigid end plate formed at one end of the rigid tubular sleeve and extending beyond the rigid tubular sleeve to form a flange, said rigid end plate having a flat outer surface and a flat under surface;

a first slot formed in said rigid tubular sleeve and extending the full length of said rigid tubular sleeve; and a second slot formed in said rigid end plate and aligned with the first slot to form a full length aperture, said second slot having two straight slot edges spaced apart to receive the connector, and said two straight slot edges extending from an outer edge of the end plate to approximately a centerline of the tubular sleeve;

wherein the connector and the cable may be positioned through the full length aperture and into the rigid tubular sleeve of said adapter, the connector may be connected to the outer surface of the rigid end plate of said adapter, and the rigid tubular sleeve of said adapter may be inserted into the conduit such that the under surface of the rigid end plate engages the conduit.

\* \* \* \* \*